(12) United States Patent
Matvieshen

(10) Patent No.: US 7,521,899 B2
(45) Date of Patent: Apr. 21, 2009

(54) METHODS AND APPARATUS FOR MANAGING ENERGY SUPPLIED BY AN ENERGY SUPPLY

(75) Inventor: Michael Matvieshen, Kelowna (CA)

(73) Assignee: B.C. Ltd., Vancouver, British Columbia (CA)

( * ) Notice: Subject to any disclaimer, the term of this patent is extended or adjusted under 35 U.S.C. 154(b) by 0 days.

(21) Appl. No.: 10/549,777

(22) PCT Filed: Jun. 20, 2003

(86) PCT No.: PCT/CA03/00893

§ 371 (c)(1),
(2), (4) Date: Oct. 4, 2006

(87) PCT Pub. No.: WO2004/086586

PCT Pub. Date: Oct. 7, 2004

(65) Prior Publication Data

US 2007/0170891 A1    Jul. 26, 2007

Related U.S. Application Data

(60) Provisional application No. 60/457,708, filed on Mar. 27, 2003.

(51) Int. Cl.
  *H01M 10/44* (2006.01)
  *H01M 10/46* (2006.01)
(52) U.S. Cl. .................................... 320/166
(58) Field of Classification Search ................ 320/103, 320/116, 132, 149, 166, 167
See application file for complete search history.

(56) References Cited

U.S. PATENT DOCUMENTS 6,320,279 B1 * 11/2001 Lopez Jimenez ............ 307/64
2003/0007369 A1   1/2003 Gilbreth et al.

FOREIGN PATENT DOCUMENTS

FR       2 686 749        7/1993
WO    WO 01/08282 A2    2/2001
WO    WO 02/081255 A1  10/2002

* cited by examiner

*Primary Examiner*—Edward Tso
(74) *Attorney, Agent, or Firm*—Pearne & Gordon LLP

(57) ABSTRACT

Methods, apparatus, media, signals and programs for managing energy supplied by an energy supply are disclosed. One such apparatus includes an energy accumulation device, which includes an energy accumulator and a controller configured to place the energy accumulator in electrical communication with the energy supply and with a load. The apparatus further includes an energy transfer device in communication with the energy accumulation device and with the energy supply and configured to transfer accumulated energy from the energy accumulator to the energy supply.

92 Claims, 10 Drawing Sheets

METHODS AND APPARATUS FOR MANAGING ENERGY SUPPLIED BY AN ENERGY SUPPLY

CROSS-REFERENCE TO RELATED APPLICATIONS

This application claims the benefit of U.S. provisional patent application Ser. No. 60/457,708, filed Mar. 27, 2003, which is hereby incorporated herein by reference.

BACKGROUND OF THE INVENTION

1. Field of Invention

The present invention relates to electrical power supply systems, and more particularly, to methods, apparatus, computer-readable media, signals, and programs for managing energy supplied by an energy supply.

2. Description of Related Art

Many applications involve an electrical load, powered by an energy supply. For example, electric automobiles typically include traction motors, powered by various types of batteries. Similarly, a flashlight typically includes a resistor connected to a battery. Thus, referring to FIG. 1, an energy supply such as that shown at 20, is typically connected to a load such as that shown at 22, for example. For ease of illustration, the load is represented as a resistor, although it will be appreciated that it is not entirely accurate to model some types of loads as resistors.

However, the present inventor has observed that some types of loads connected to energy supplies in the above fashion result in wasted energy. For example, in many cases an electrical load will transfer, dissipate or consume more energy than necessary in order to complete the task that is required of it. In order to generate the energy that is being dissipated or consumed by the load, the energy supply must deplete at least an equivalent amount of its own potential energy store (in fact, slightly more, due to inefficiencies and imperfections in any system). As a result, the duration of the energy supply is shorter than it would have been, if not for the wasted energy unnecessarily transferred or consumed by the load.

SUMMARY OF THE INVENTION

The present invention addresses the above shortcoming by providing, in accordance with one aspect of the invention, an apparatus for managing energy supplied by an energy supply. The apparatus includes an energy accumulation device, which in turn includes an energy accumulator and a controller configured to place the energy accumulator in electrical communication with the energy supply and with a load. The apparatus further includes an energy transfer device in communication with the energy accumulation device and with the energy supply and configured to transfer accumulated energy from the energy accumulator to the energy supply.

It has been found that the use of such an apparatus to manage the energy supplied by the energy supply in the above manner may serve to significantly reduce the wasted energy unnecessarily transferred or consumed by the load, thereby significantly extending the duration for which the energy supply is able to supply energy to operate the load.

The controller may be configured to temporarily place the energy accumulator in electrical communication with the load and the energy supply. For example, the controller may be configured to temporarily interpose the energy accumulator with the load and the energy supply.

The energy accumulator may include a capacitor. In such a case, the energy transfer device may be configured to permit discharge of the capacitor into the energy supply.

The energy accumulator may include a first energy accumulator for accumulating energy during a first cycle, and a second energy accumulator for accumulating energy during a second cycle. The first and second energy accumulators may include first and second capacitors respectively.

In such an embodiment, the energy accumulation device and the energy transfer device may be configured to cooperate to transfer accumulated energy from the second energy accumulator into the energy supply during the first cycle, and to transfer accumulated energy from an energy accumulator of the energy accumulation device other than the second energy accumulator into the energy supply during the second cycle. The energy accumulator other than the second energy accumulator may include the first energy accumulator.

The energy accumulation device may be configured to cooperate to repeatedly execute the first and second cycles in succession.

The controller of the energy accumulation device may be configured to control a switching system to charge the first capacitor and discharge the second capacitor into the energy supply during the first cycle, and to charge the second capacitor and discharge the first capacitor into the energy supply during the second cycle.

In such embodiments, the controller may be configured to maintain a first switch closed while maintaining a second switch open during the first cycle, to place the first capacitor in series with the energy supply and the load while isolating the first capacitor from the energy transfer device. The controller may be configured to maintain a third switch open while maintaining a fourth switch closed during the first cycle, to isolate the second capacitor from the load while placing the second capacitor in communication with the energy transfer device.

The controller may be configured to maintain the first switch open while maintaining the second switch closed during the second cycle, to isolate the first capacitor from the load while placing the first capacitor in communication with the energy transfer device. The controller may also be configured to maintain the third switch closed while maintaining the fourth switch open during the second cycle, to place the second capacitor in series with the energy supply and the load while isolating the second capacitor from the energy transfer device.

The controller may be configured to adjust respective durations for which the first switch and the third switch are maintained closed to charge the first and second capacitors respectively, in response to a charge time control signal.

If so, the apparatus may further include a charge time control signal generator configured to generate the charge time control signal. For example, such a signal may be generated in response to an adjustable setting of a throttle control. In such an embodiment, the apparatus may further include the throttle control, which in turn may include a variable resistor. The charge time control signal generator may include an analog-to-digital converter configured to generate the charge time control signal in response to a resistance of the variable resistor.

The controller may be configured to adjust respective durations for which the second switch and the fourth switch are maintained closed to discharge the first and second capacitors respectively, in response to a discharge time control signal. If so, the apparatus may further include a discharge time control signal generator configured to generate the discharge time control signal. For example, the discharge time control signal may be generated in response to a voltage of the discharge of the first and second capacitors. The discharge time control signal generator may include an analog-to-digital converter.

The apparatus may further include the switching system, which may include a transistor switching system. Thus, the apparatus may further include the first, second, third and fourth switches, each of which includes a respective transistor. Each of the first, second, third and fourth switches may further include a driver for operating each of the transistors in response to control signals from the controller.

The apparatus may further include the switching system, which alternatively may include a mechanical switching system.

The controller may include a microcontroller.

The energy transfer device may include an input port for receiving the accumulated energy from the energy accumulation device in the form of an electrical discharge.

The energy transfer device may include a second controller configured to increase an output voltage at an output port of the energy transfer device in communication with the energy supply, to cause the output voltage to tend to a desired voltage exceeding a voltage of the energy supply.

The energy transfer device may include an inductor, and wherein the second controller may be configured to increase the output voltage by allowing current to flow from the input port through the inductor until the output voltage may be at least the desired voltage. The energy transfer device may further include a transistor in communication with the inductor, and the second controller may be configured to control the transistor to control the current through the inductor.

The energy transfer device may further include an output voltage monitor configured to monitor the output voltage, and the second controller may be configured to control the current through the inductor in response to the output voltage.

The energy transfer device may include an isolator configured to prevent current from flowing from the energy supply into the output port of the energy transfer device. The isolator may include a diode.

In accordance with another aspect of the invention, there is provided a method of managing energy supplied by an energy supply. The method includes accumulating energy in an energy accumulator in electrical communication with the energy supply and with a load, and transferring accumulated energy from the energy accumulator to the energy supply.

Accumulating may include temporarily placing the energy accumulator in electrical communication with the load and the energy supply, which may include temporarily interposing the energy accumulator in series with the load and the energy supply.

Temporarily placing the energy accumulator may include temporarily placing a capacitor in electrical communication with the load and the energy supply to charge the capacitor. Transferring may include discharging the capacitor into the energy supply.

Accumulating may include accumulating energy in a first energy accumulator during a first cycle, and accumulating energy in a second energy accumulator during a second cycle. The first and second energy accumulators may include first and second capacitors respectively. Transferring may include transferring accumulated energy from the second energy accumulator into the energy supply during the first cycle, and transferring accumulated energy from an energy accumulator other than the second energy accumulator into the energy supply during the second cycle. The energy accumulator other than the second energy accumulator may include the first energy accumulator.

Accumulating and transferring may include repeatedly executing the first and second cycles in succession. Executing may include controlling a switching system to charge the first capacitor and discharge the second capacitor into the energy supply during the first cycle, and to charge the second capacitor and discharge the first capacitor into the energy supply during the second cycle. Controlling may include, during the first cycle, maintaining a first switch closed while maintaining a second switch open, to place the first capacitor in series with the energy supply and the load while isolating the first capacitor from an energy transfer device. Controlling may further include, during the first cycle, maintaining a third switch open while maintaining a fourth switch closed, to isolate the second capacitor from the load while placing the second capacitor in communication with the energy transfer device. Controlling may include, during the second cycle, maintaining the first switch open while maintaining the second switch closed, to isolate the first capacitor from the load while placing the first capacitor in communication with the energy transfer device. Controlling may further include, during the second cycle, maintaining the third switch closed while maintaining the fourth switch open, to place the second capacitor in series with the energy supply and the load while isolating the second capacitor from the energy transfer device.

The method may further include adjusting respective durations for which the first switch and the third switch are maintained closed to charge the first and second capacitors respectively, in response to a charge time control signal. The method may further include generating the charge time control signal, which may be generated in response to an adjustable throttle setting if desired.

The method may further include adjusting respective durations for which the second switch and the fourth switch are maintained closed to discharge the first and second capacitors respectively, in response to a discharge time control signal. The method may further include generating the discharge time control signal, in response to a voltage of the discharge of the first and second capacitors.

Controlling a switching system may include controlling a transistor switching system. In such a case, each of the first, second, third and fourth switches may include a respective transistor, such as a field effect transistor, for example. Alternatively, controlling a switching system may include controlling a mechanical switching system.

Transferring may include receiving the accumulated energy from the energy accumulation device at an input port of an energy transfer device in the form of an electrical discharge.

The method may further include increasing an output voltage at an output port of the energy transfer device in communication with the energy supply, to cause the output voltage to tend to a desired voltage exceeding a voltage of the energy supply. Increasing the output voltage may include allowing current to flow from the input port through an inductor until the output voltage is at least the desired voltage. The method may further include monitoring the output voltage and controlling the current through the inductor in response to the output voltage.

The method may also include preventing current from flowing from the energy supply into the output port of the energy transfer device.

In accordance with another aspect of the invention, there is provided an apparatus for managing energy supplied by an energy supply. The apparatus includes means for accumulating energy, in electrical communication with the energy supply and with a load, and further includes means for transferring accumulated energy from the means for accumulating energy to the energy supply.

The apparatus may further include means for carrying out any of the functions described herein.

In accordance with another aspect of the invention, there is provided a computer-readable medium storing codes for directing a processor circuit to cause the methods described herein to be carried out.

In accordance with another aspect of the invention, there is provided a signal embodied in a communications medium, the signal including code segments for directing a processor circuit to cause the methods described herein to be carried out. In accordance with yet another aspect of the invention, the signal may alternatively be embodied in a carrier wave.

In accordance with another aspect of the invention, there is provided a computer program comprising code means for directing a processor circuit to cause the methods described herein to be carried out.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings that illustrate embodiments of the invention.

DETAILED DESCRIPTION

Figure 1:
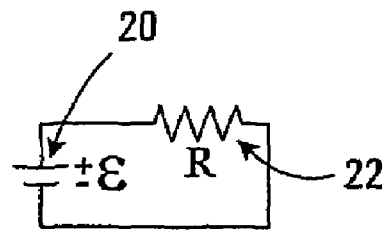
FIG. 1 is a circuit diagram of an energy supply and a load, according to the prior art.
Figure 2:
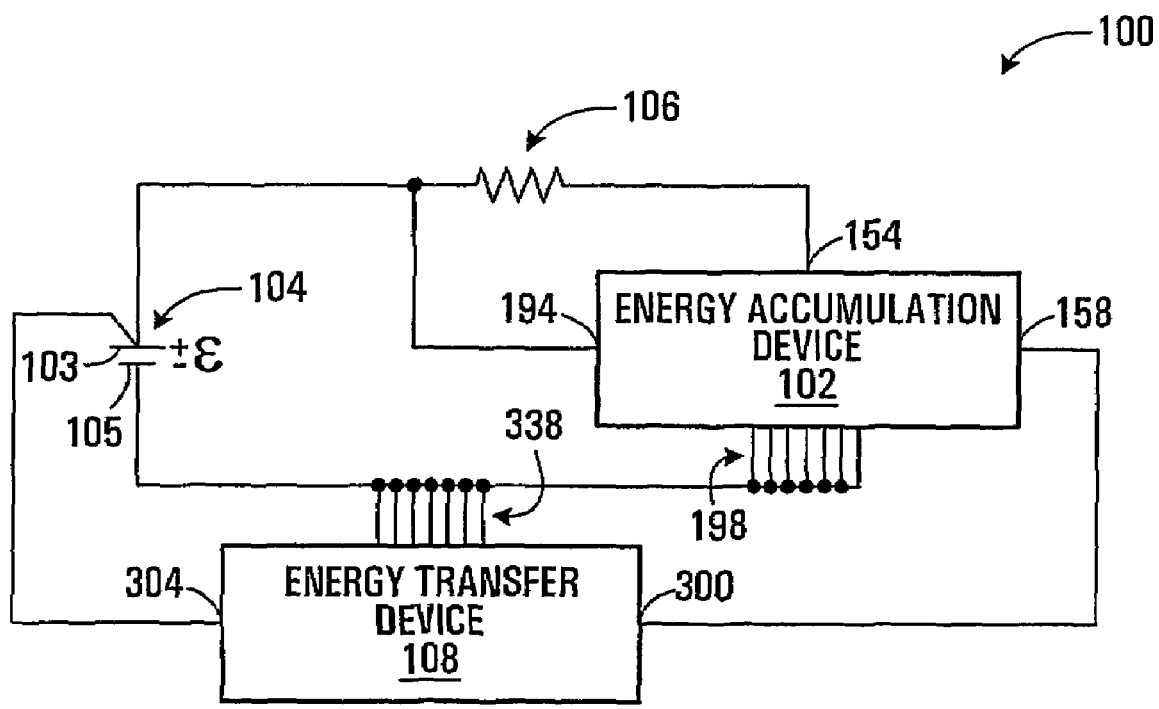
FIG. 2 is a circuit diagram of an apparatus for managing energy supplied by an energy supply, according to a first embodiment of the invention.

Referring to FIG. 2, an apparatus for managing energy supplied by an energy supply according to a first embodiment of the invention is shown generally at 100. In this embodiment, the apparatus 100 includes an energy accumulation device shown generally at 102, including an energy accumulator, and a controller configured to place the energy accumulator in electrical communication with an energy supply 104 and with a load 106. In this embodiment, the apparatus 100 also includes an energy transfer device 108 in communication with the energy accumulation device 102 and with the energy supply 104. The energy transfer device 108 is configured to transfer accumulated energy from the energy accumulator of the energy accumulation device 102 to the energy supply 104.

In this embodiment, for ease of illustration, the load 106 is represented as a simple resistor, although more generally, the load 106 may include other types of loads, including loads that cannot be accurately represented by a simple resistor. For example (without limitation), the load may include an electric motor, if desired.

In the present embodiment, the energy supply 104 has a positive terminal 103 and a negative terminal 105. In general, the energy supply 104 may include any device capable of applying an electromotive force. It will therefore be understood that the use of the symbol shown in FIG. 2 to depict the energy supply is intended to broadly encompass any such source of electromotive force, rather than the narrower alternative meaning sometimes attributed to that symbol (i.e., a single cell electrical energy supply). In this embodiment, the energy supply 104 includes a multi-cell electrical energy supply, which in this embodiment is a 24V lead-acid battery. Alternatively, however, other types of batteries, or more generally, other suitable types of energy supplies, may be substituted.

Energy Accumulation Device

Figure 3:
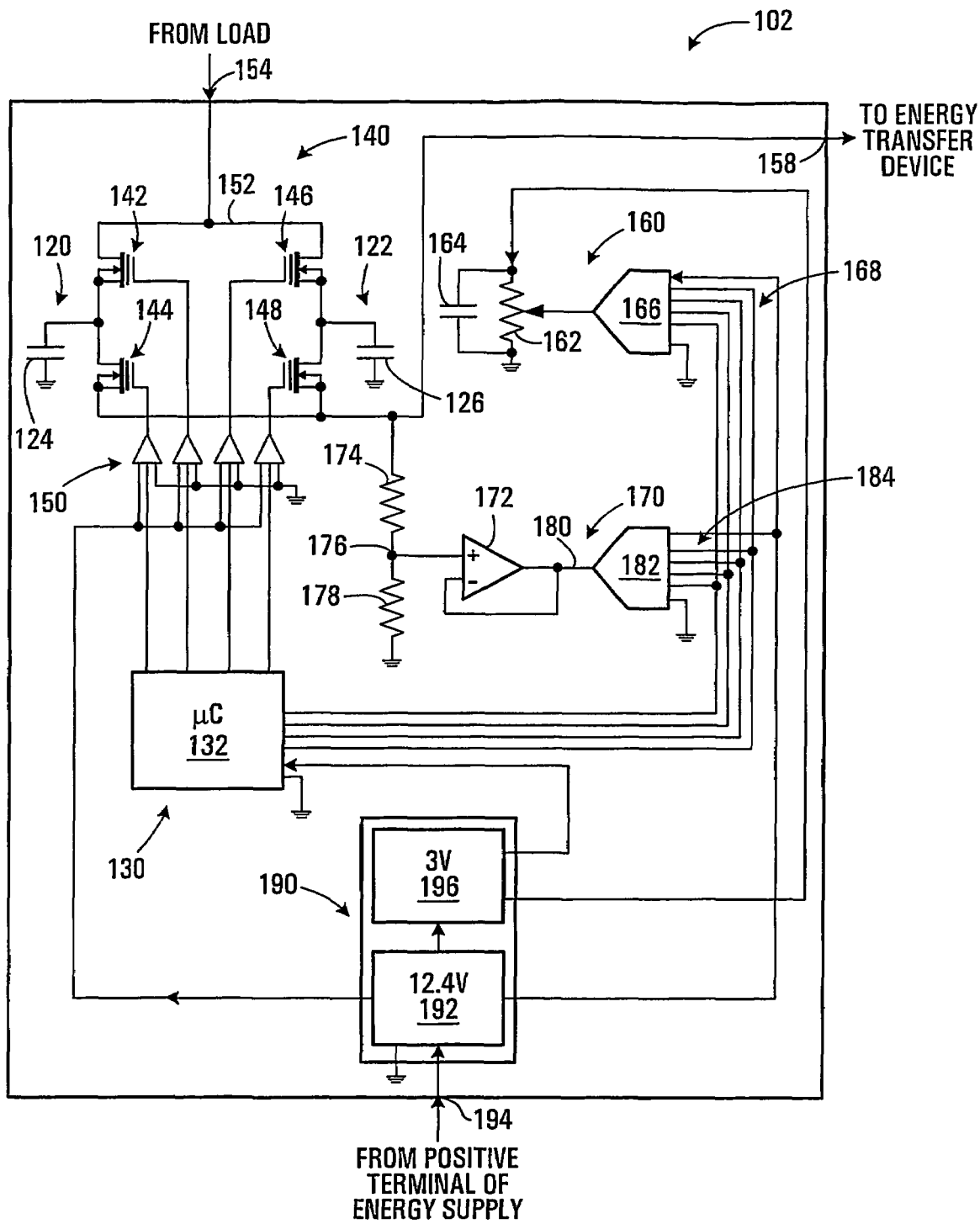
FIG. 3 is a circuit diagram of an energy accumulation device of the apparatus shown in FIG. 2.

Referring to FIGS. 2 and 3, the energy accumulation device 102 is shown in greater detail in FIG. 3. In this embodiment, the energy accumulation device includes an energy accumulator, or more particularly, includes a first energy accumulator 120 for accumulating energy during a first cycle, and a second energy accumulator 122 for accumulating energy during a second cycle. More particularly, in this embodiment the first and second energy accumulators 120 and 122 include first and second capacitors 124 and 126, respectively.

More particularly still, in the present embodiment, each of the capacitors 124 and 126 is designed to operate at 25 V, and has a capacitance of 43,000 μF. In this embodiment, the capacitors 124 and 126 were selected for their desired capacitance, as well as their ability to be controlled at a desired switching speed, which in this embodiment is approximately 107 Hz. In addition, it is desirable for the capacitors to have low internal series resistance (ESR), to facilitate fast charging and discharging with minimal energy loss. In this embodiment, the capacitors 124 and 126 have an internal series resistance of approximately 0.009 Ω at a temperature of 120° C. Alternatively, however, other types of capacitors, or more generally, other suitable types of energy accumulators, may be substituted. In this embodiment, the energy accumulation device 102 includes a controller shown generally at 130, which is configured to temporarily place each of the energy accumulators 120 and 122 in electrical communication with the load 106 and the energy supply 104. More particularly, in this embodiment, the controller 130 is configured to temporarily interpose each of the energy accumulators in series with the load and the energy supply.

In this embodiment, the controller 130 includes a microcontroller 132, or more particularly, a model number AT90S1200 microcontroller manufactured by Atmel Corporation, having a clock speed of 4 MHz.

Alternatively, other types of microcontrollers may be substituted. More generally, in this specification, including the claims, the term "controller" is intended to broadly encompass any type of device or combination of devices capable of performing the functions described herein, including (without limitation) other types of microcontrollers, microprocessors, other integrated circuits, other types of circuits or combinations of circuits, logic gates or gate arrays, or programmable devices of any sort, for example, either alone or in combination with other such devices located at the same location or remotely from each other, for example. Additional types of controllers will be apparent to those ordinarily skilled in the art upon review of this specification, and substitution of any such other types of controllers is considered not to depart from the scope of the present invention as defined by the claims appended hereto.

In the present embodiment, the energy accumulation device 102 further includes a switching system shown generally at 140. In this embodiment, the switching system 140 includes a transistor switching system. More particularly, in the present embodiment, the switching system 140 includes first, second, third and fourth switches, each of which includes a respective transistor. More particularly still, in the present embodiment, the first, second, third and fourth switches respectively include first, second, third and fourth field effect transistors (FETs) 142, 144, 146 and 148. Also in this embodiment, each of the first, second, third and fourth switches includes a corresponding one of a plurality of drivers shown generally at 150. Each of the drivers 150 is used to operate its corresponding FET in response to control signals from the controller 130.

In this embodiment, each of the FETs 142, 144, 146 and 148 includes a model IRL 38035 field effect transistor manufactured by International Rectifier Corporation.

In the present embodiment, the FETs were selected for their current-handling ability (in this embodiment, 40 Amps), for their corresponding voltage-handling ability, for their switching speed (in this embodiment, a rise and fall time on the order of 20 nano-seconds), and for their ability to handle high temperatures (in this embodiment, in the range of 150° C.). Alternatively, other types of FETs may be substituted. More generally, other types of switches may be substituted.

Referring to FIGS. 2 and 3, in the present embodiment, the switching system 140 includes an input line 152, which is connected, via an input port 154 of the energy accumulation device 102, to the load 106. Also in this embodiment, the switching system 140 includes an output line 156, which is connected, via an output port 158 of the energy accumulation device 102, to the energy transfer device 108.

In this embodiment, the energy accumulation device further includes a charge time control signal generator shown generally at 160. Generally, in this embodiment, the charge time control signal generator 160 is configured to generate a charge time control signal. More particularly, in this embodiment the charge time control signal generator is configured to generate the charge time control signal in response to an adjustable setting of a throttle control. Alternatively, however, the charge time control signal may be generated in response to other input(s), or may be predefined if desired.

More particularly, in the present embodiment, the throttle control of the charge time control signal generator 160 includes a variable resistor 162, which in this embodiment is manually controllable by a rotatable switch (not shown), to allow a user of the apparatus 100 to "throttle" or control the rate at which the apparatus 100 accumulates and transfers energy. In this embodiment, the variable resistor 162 has a maximum resistance of approximately 5 kΩ, and is manually controllable over a continuous resistance range of approximately 0.5-5.0 kΩ.

In this embodiment, the variable resistor 162 is connected in parallel with a capacitor 164, which in this embodiment has a capacitance of approximately 3 μF.

In the present embodiment, the charge time control signal generator 160 further includes an analog-to-digital (A/D) converter 166, which is configured to generate the charge time control signal in response to a resistance of the variable resistor 162. Effectively, the A/D converter 166 acts as a digital ohmmeter to measure the variable resistance of the variable resistor, which in turn is determined by the above-mentioned manual adjustment of the rotatable switch (not shown) by the user. In response to the measured voltage drop across the variable resistor 162, the charge time control signal generator 160 produces digital signals on signal lines shown generally at 168, which are connected to signal line input ports of the controller 130. More particularly, in this embodiment the A/D converter 166 produces digital signals representing the resistance of the resistor 162 as a value between 0 and 255, with 0 representing the minimum resistance and 255 representing the maximum resistance of the resistor 162, respectively.

In this embodiment, the energy accumulation device 102 further includes a discharge time control signal generator shown generally at 170. In this embodiment, the discharge time control signal generator 170 is configured to generate a discharge time control signal, in response to a voltage of the discharge of the first and second capacitors. More particularly, in this embodiment, the discharge time control signal generator 170 includes an operational amplifier 172. The output line 156 of the switching system 140 is connected through a resistor 174 to the amplifier 172 at a connection point 176, which in turn is connected to a resistor 178 connected to ground. In this embodiment, the resistors 174 and 178 have resistances of 100 kΩ and 50 kΩ, respectively. The operational amplifier 172 produces a signal on a signal line 180, having a voltage proportional to the voltage on the output line 156 of the switching system 140. In this embodiment, the operational amplifier is a model no. PTLC27M7CD operational amplifier manufactured by Texas Instruments Corporation. Alternatively, other types of amplifiers may be substituted.

In this embodiment, the discharge time control signal generator 170 further includes an analog-to-digital (A/D) converter 182, produces digital signals on signal lines 184 in response to the voltage present on the signal line 180, which in turn is proportional to the voltage on the output line 156 of the switching system 140. The signal lines 184 are connected to input ports of the controller 130. The signal lines 184 may be connected to the same input ports as the signal lines 168, provided the controller 130 employs a communications protocol that enables it to differentiate the charge time control signals received from the charge time control signal generator 160, from the discharge time control signals received from the discharge time control signal generator 170. Alternatively, the signal lines 184 may be connected to different input ports than the signal lines 168. In this embodiment, the digital signals produced by the A/D converter 182 represent a value between 0 and 255, corresponding to a minimum and a maximum expected voltage (in this embodiment, 0V and 3V respectively) of the signal received from the operating amplifier 172, which in turn is proportional to the voltage on the output line 156 (which in this embodiment is typically fluctuating up to about 10V).

In the present embodiment, the energy accumulation device 102 further includes a power supply 190. In this embodiment, the power supply 190 includes a first voltage regulator 192, which is in electrical communication with the positive terminal 103 of the energy supply 104 via a power input port 194 of the energy accumulation device 102. The first voltage regulator 192 receives input voltage from the energy supply 104, in this embodiment at a voltage of approximately 24 V, and supplies reduced voltages to various components of the energy accumulation device 102. More particularly, in this embodiment the first voltage regulator 192 provides 12.4 V to the drivers 150, the FETs 142, 144, 146 and 148, the A/D converters 166 and 182, and a second voltage regulator 196. The second voltage regulator 196 provides 3V to the controller 130, and to the throttle control (or more particularly, to the variable resistor 162) of the charge time control signal generator 160.

Referring to FIGS. 2 and 3, in this embodiment, the negative terminal 105 of the energy supply 104 shown in FIG. 2 is used as the ground for the various components of the energy accumulation device 102 shown in FIG. 3. Thus, it will be understood that each of the various connections symbolized as "ground" connections in FIG. 3 is in electrical communication with the negative terminal 105 of the energy supply 104, via a respective one of a plurality of lines 198 shown in FIG. 2 (not shown in FIG. 3).

Figure 4:
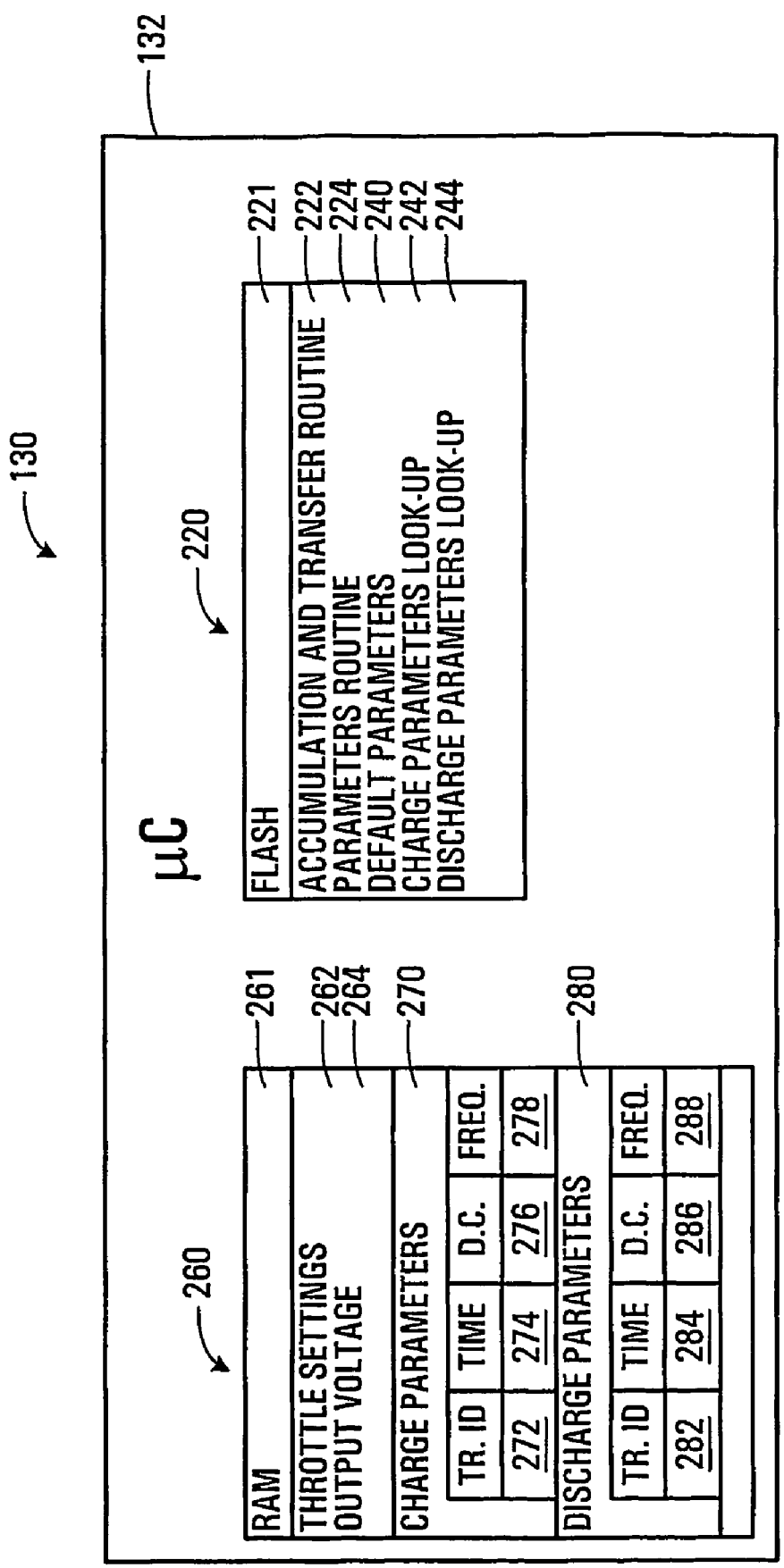
FIG. 4 is a block diagram of a microcontroller of the energy accumulation device shown in FIG. 3.

Referring to FIGS. 3 and 4, the controller of the energy accumulation device 102 is shown in greater detail at 130 in FIG. 4. As noted above, in this embodiment the controller 130 includes the microcontroller 132, which in this embodiment has first and second storage devices 220 and 260 respectively. More particularly, in this embodiment the first storage device 220 includes a non-volatile memory, which in this embodiment is a FLASH memory 221, and the second storage device 260 includes a volatile memory, which in this embodiment is a random access memory (RAM) 261.

In the present embodiment, the first storage device 220, or more particularly, the FLASH memory 221, stores a plurality of routines including instruction codes that program or configure the microcontroller 132 to execute the functionality described herein. More particularly, in this embodiment, the routines stored in the first storage device 220 include an accumulation and transfer routine 222, and a parameters routine 224, both of which are described in greater detail below. Effectively, therefore, in this embodiment the first storage device 220 is a computer-readable medium storing codes for directing a processor circuit (in this embodiment, the microcontroller 132) to cause the methods described herein to be carried out. However, the first storage device 220 is merely one example of such a computer readable medium. Alternatively, such routines or instruction codes may be provided as software stored on a different medium such as a ROM, an EPROM or an EEPROM, or a compact disc or a floppy diskette, for example, or available from a communications medium such as the Internet, for example. More broadly, any computer-readable medium capable of being used to generate a signal embodied in a communications medium including code segments for directing a processor circuit to cause the methods described herein to be executed may be substituted. More generally, any other suitable medium may be substituted.

In addition to such routines, in the present embodiment, the first storage device 220 also stores various data for use by the microcontroller 132, and thus includes a default parameters store 240, a charge parameters look-up table 242, and a discharge parameters look-up table 244.

The routines described above configure the microcontroller 132 to define various registers or stores in the second storage device 260, or more particularly, in the RAM 261, including a throttle setting register 262, an output voltage register 264, a charge parameters store 270, and a discharge parameters store 280. The throttle setting register 262 is used to store a value representing a measurement of the throttle control produced by the A/D converter 166 of the charge time control signal generator 160, and the output voltage register 264 is used to store a value representing a measurement of the voltage on the output line 156 produced by the A/D converter 182 of the discharge time control signal generator 170.

The charge parameters store 270 is used to define and store a table of charging parameters that the microcontroller 132 uses to control the FETs 142 and 146, to control the charging of the capacitors 124 and 126 respectively. In this embodiment, the charge parameters store 270 includes a record for each of the FETs 142 and 146, and includes a transistor identification field 272, for identifying the relevant FET (142 or 146), and a charge time field 274, which determines the amount of time in each cycle for which the FET is to be turned on to permit current to flow therethrough, from the input port 154 and the input line 152 into the relevant capacitor 124 or 126. If desired, the charge parameters store 270 may also include fields for storing further parameters for controlling the FETs 142 and 146 to control the charging of the capacitors 124 and 126. For example, such additional fields may include a duty cycle field 276 and a duty cycle frequency field 278 for storing a desired duty cycle (e.g. on (x) % of the time, off (100-x) % of the time), and a desired frequency at which the FET switches between the on and off portions of its duty cycle.

Similarly, in this embodiment the discharge parameters store 280 is used to define and store a table of discharging parameters that the microcontroller 132 uses to control the FETs 144 and 148, to control the discharging of the capacitors 124 and 126 onto the output line 156 of the switching system 140. In this embodiment, the discharge parameters store 280 includes a transistor identification field 282, for identifying the relevant FET (144 or 148), and a discharge time field 284, which determines the amount of time in each cycle for which the FET is to be turned on to permit current to flow therethrough, from the relevant capacitor 124 or 126 onto the output line 156. If desired, the discharge parameters store 280 may also include fields for storing further parameters for controlling the FETs 144 and 148 to control the discharging of the capacitors 124 and 126, such as a duty cycle field 286 and a duty cycle frequency field 288 similar to their counterpart fields 276 and 278 described above in connection with the charge parameters store 270, for example.

As discussed in greater detail below in connection with the parameters routine 224 and the accumulation and transfer routine 222, generally, the parameters routine 224 continuously executes to cause the microcontroller 132 to generate and store appropriate values in the charge parameters store 270 and the discharge parameters store 280, and the accumulation and transfer routine 222 directs the microcontroller 132 to use such parameters to control the charging of the capacitors 124 and 126 and their subsequent discharging to the energy transfer device 108 via the output line 156.

Energy Transfer Device

Figure 5:
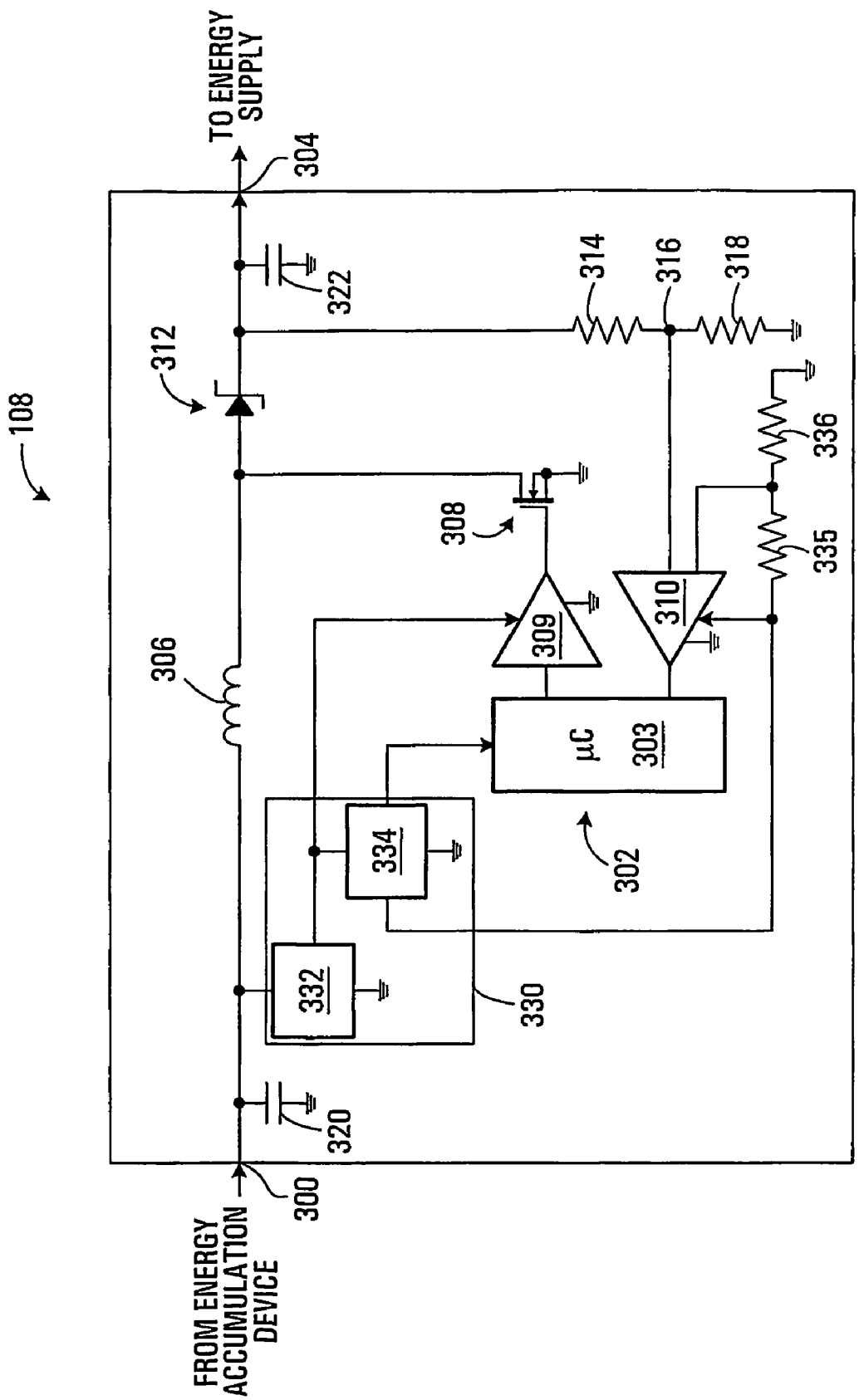
FIG. 5 is a circuit diagram of an energy transfer device of the apparatus shown in FIG. 2.

Referring to FIGS. 2 and 5, the energy transfer device of the present embodiment is shown in greater detail at 108 in FIG. 5. In this embodiment, the energy transfer device 108 includes an input port 300 for receiving accumulated energy from the energy accumulation device 102 in the form of an electrical discharge.

In the present embodiment, the energy transfer device 108 also includes a second controller 302 configured to increase an output voltage at an output port 304 of the energy transfer device in communication with the energy supply 104, to cause the output voltage at the output port 304 to tend to a desired voltage exceeding a voltage of the energy supply 104. More particularly, in this embodiment, the input voltage received at the input port 300 is typically fluctuating, up to about 10 V, and the second controller is configured to increase the output voltage at the output port 304 to cause it to tend to exceed the energy supply voltage, which in this embodiment is 24 V.

To achieve this, in this embodiment, the energy transfer device 108 includes an inductor 306, and the second controller 302 is configured to increase the output voltage at the output port 304 by allowing current to flow from the input port 300 through the inductor 306 until the output voltage is at least the desired voltage. In this embodiment, the second controller 302 includes a microcontroller 303 similar to the microcontroller 132 of the energy accumulation device 102. Also in this embodiment, the inductor 306 is a 40-turn, 30V/40A/1200W inductor, although alternatively, other inductors may be substituted.

To allow the second controller 302 to control the current flow through the inductor 306, and hence to control the output voltage, in the present embodiment, the energy transfer device 108 includes a transistor 308 in communication with the inductor 306, and the second controller 302 is configured to control the transistor 308 to control the current through the inductor 306. More particularly, in this embodiment the transistor 308 includes a field effect transistor (FET), and the energy transfer device 108 includes a driver 309, which is used to control the transistor 308 in response to control signals received at the driver 309 from the second controller 302.

In the present embodiment, the energy transfer device 108 further includes an output voltage monitor 310 configured to monitor the output voltage at the output port 304, and the second controller 302 is configured to control the current through the inductor 306 in response to the output voltage. More particularly, in this embodiment the output voltage monitor 310 includes a comparator. In this embodiment, the output port 304 is connected through a resistor 314 to the output voltage monitor 310 at a connection point 316, which in turn is connected through a resistor 318 to ground. In this embodiment, the resistor 314 has a resistance of 190 kΩ, and the resistor 318 has a resistance of 10 kΩ. In the present embodiment, the output voltage monitor 310 also receives a reference voltage signal, as discussed in greater detail below. The output voltage monitor 310, or more particularly, the comparator, effectively divides the voltage detected at the connection point 316, and compares the divided voltage to the reference voltage, to indirectly determine whether the voltage at the output port 304 exceeds or is less than one or more desired voltage levels.

Alternatively, the output voltage monitor 310 may include an analog-to-digital converter. Alternatively, any other suitable type of voltage monitor may be substituted.

In this embodiment, the energy transfer device 108 also includes an isolator 312 configured to prevent current from flowing from the energy supply 104 into the output port 304 of the energy transfer device 108. In the present embodiment, the isolator. 312 includes a diode, which effectively permits current to flow in only a single direction. More particularly, the diode has a low minimum forward voltage (i.e., a low minimum voltage that is required to conduct current in the forward direction, such as 0.2V, for example), but has an extremely high minimum rearward voltage, significantly exceeding that of the energy supply 104. Alternatively, other types of isolators may be substituted if desired.

In this embodiment, the energy transfer device 108 further includes a first capacitor 320 proximate to the input port 300, and a second capacitor 322 proximate to the output port 304. In the present embodiment, the first capacitor 320 has a capacitance of 50 F, and serves to reduce losses in the inductor 306. The second capacitor 322 has a smaller capacitance, which in this embodiment is approximately 3300 μF.

Referring to FIGS. 2, 3 and 5, in the present embodiment, the energy transfer device 108 further includes a power supply 330. In this embodiment, the power supply 330 includes a voltage booster 332, which is in electrical communication with the input port 300 of the energy transfer device 108. Effectively, therefore, in this embodiment, the various components of the energy transfer device 108 draw their power from the power output of the switching system 140 of the energy accumulation device 102. The voltage booster 332 serves to boost the voltage received at the input port (typically up to about 10 V) to a slightly higher voltage of 12.4V, which it supplies to the driver 309, and also to a voltage regulator 334.

The voltage regulator 334 receives the 12.4 V input, in response to which it outputs 3V to supply power to the second controller 302, and also to the output voltage monitor 310. In this embodiment, in addition to supplying 3V power to the output voltage monitor, the voltage regulator 334 also effectively supplies the reference voltage signal to the output voltage monitor. In this regard, the 3V power supply from the voltage regulator 334 is also applied to first and second resistors 335 and 336 in series, which in this embodiment each have a resistance of 100 kΩ. A reference signal input port of the output voltage monitor 310 is connected to a point interposed between the resistors 335 and 336, to receive the reference voltage signal therefrom.

Referring to FIGS. 2 and 5, in this embodiment, the negative terminal 105 of the energy supply 104 shown in FIG. 2 is used as the ground for the various components of the energy transfer device 108 shown in FIG. 5. Thus, it will be understood that each of the various connections symbolized as "ground" connections in FIG. 5 is in electrical communication with the negative terminal 105 of the energy supply 104, via a respective one of a plurality of lines 338 shown in FIG. 2 (not shown in FIG. 5).

Figure 6:
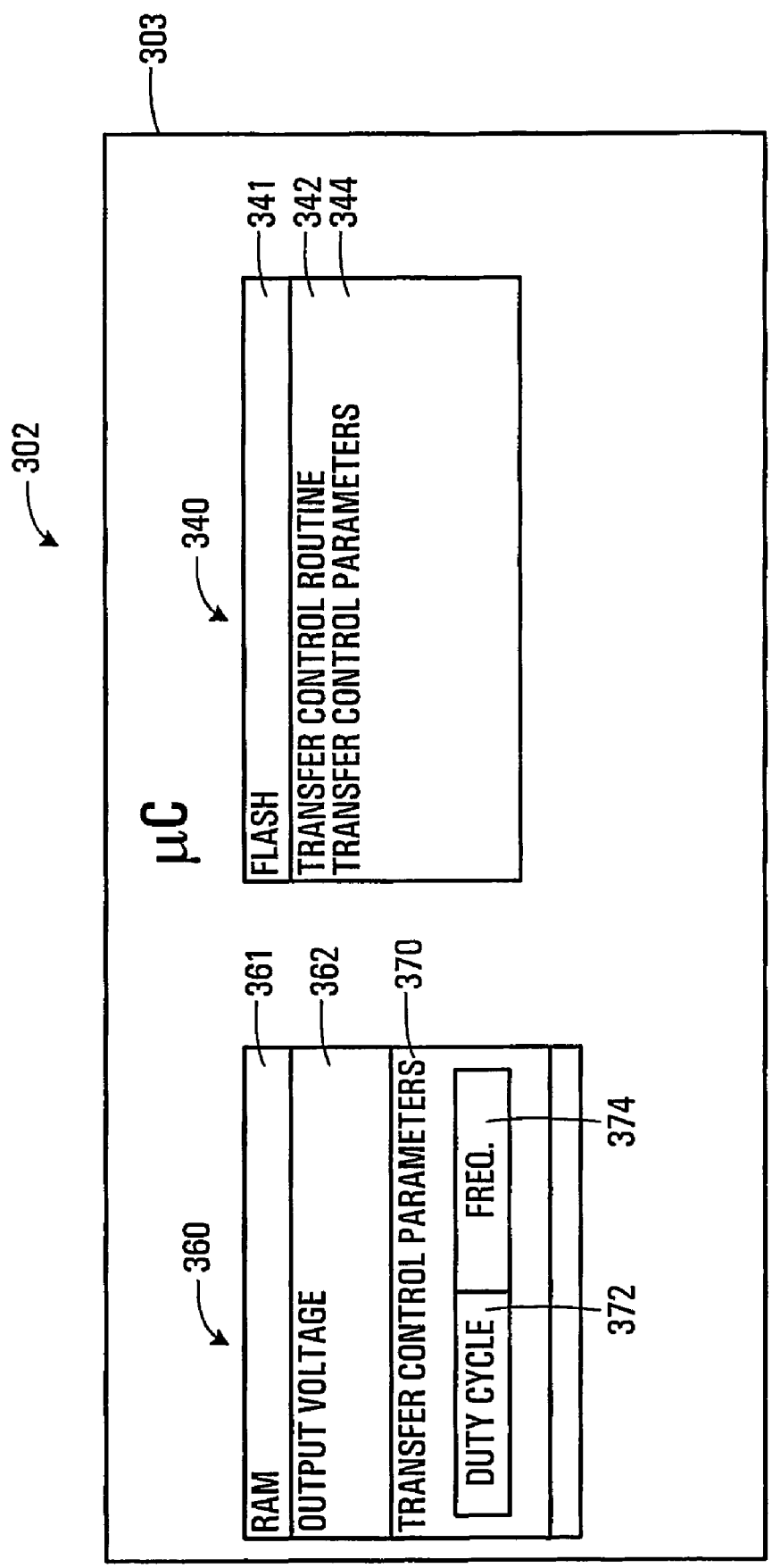
FIG. 6 is a block diagram of a microcontroller of the energy transfer device shown in FIG. 5.

Referring to FIGS. 5 and 6, the second controller of the energy transfer device 108 is shown in greater detail at 302 in FIG. 6. As noted above, in this embodiment the second controller 302 includes the microcontroller 303, which in this embodiment has first and second storage devices 340 and 360 respectively. More particularly, in this embodiment the first storage device 340 includes a non-volatile memory, which in this embodiment is a FLASH memory 341, and the second storage device 360 includes a volatile memory, which in this embodiment is a random access memory (RAM) 361.

In the present embodiment, the first storage device 340, or more particularly, the FLASH memory 341, is used to store routines including instruction codes that program or configure the microcontroller 303 to execute the functionality described herein. More particularly, in this embodiment, the FLASH memory 341 stores a transfer control routine 342, described in greater detail below. Effectively, therefore, in this embodiment the first storage device 340 is an example of a computer-readable medium storing codes for directing a processor circuit (in this embodiment, the microcontroller 303) to cause the methods described herein to be carried out.

In addition, in this embodiment, the first storage device 340 also stores various data for use by the microcontroller 303, and thus includes a transfer control parameters store 344 for storing sets of selectable transfer control parameters for use by the microcontroller 303 in controlling the transistor 308 to effectively control the output voltage at the output port 304, as described in greater detail below.

The transfer control routine 342 configures or programs the microcontroller 303 to define various registers or stores in the second storage device 360, or more particularly, in the RAM 361, including an output voltage register 362 and a transfer control parameters store 370. The output voltage register 362 is used to store a value representing a measurement of the output voltage at the output port 304, produced by the output voltage monitor 310.

The transfer control parameters store 370 is used to define and store a table of control parameters that the microcontroller 303 uses to control the transistor 308, in order to effectively control the current through the inductor 306, and hence to control the output voltage at the output port 304. More particularly, in this embodiment, in which the transistor 308 is a FET, the transfer control parameters store 370 includes a duty cycle field 372 and a duty cycle frequency field 374 for storing a desired duty cycle (e.g. on (x) % of the time, off (100-x) % of the time), and a desired frequency at which the FET switches between the on and off portions of its duty cycle.

Operation

Parameters Routine

Figure 7:
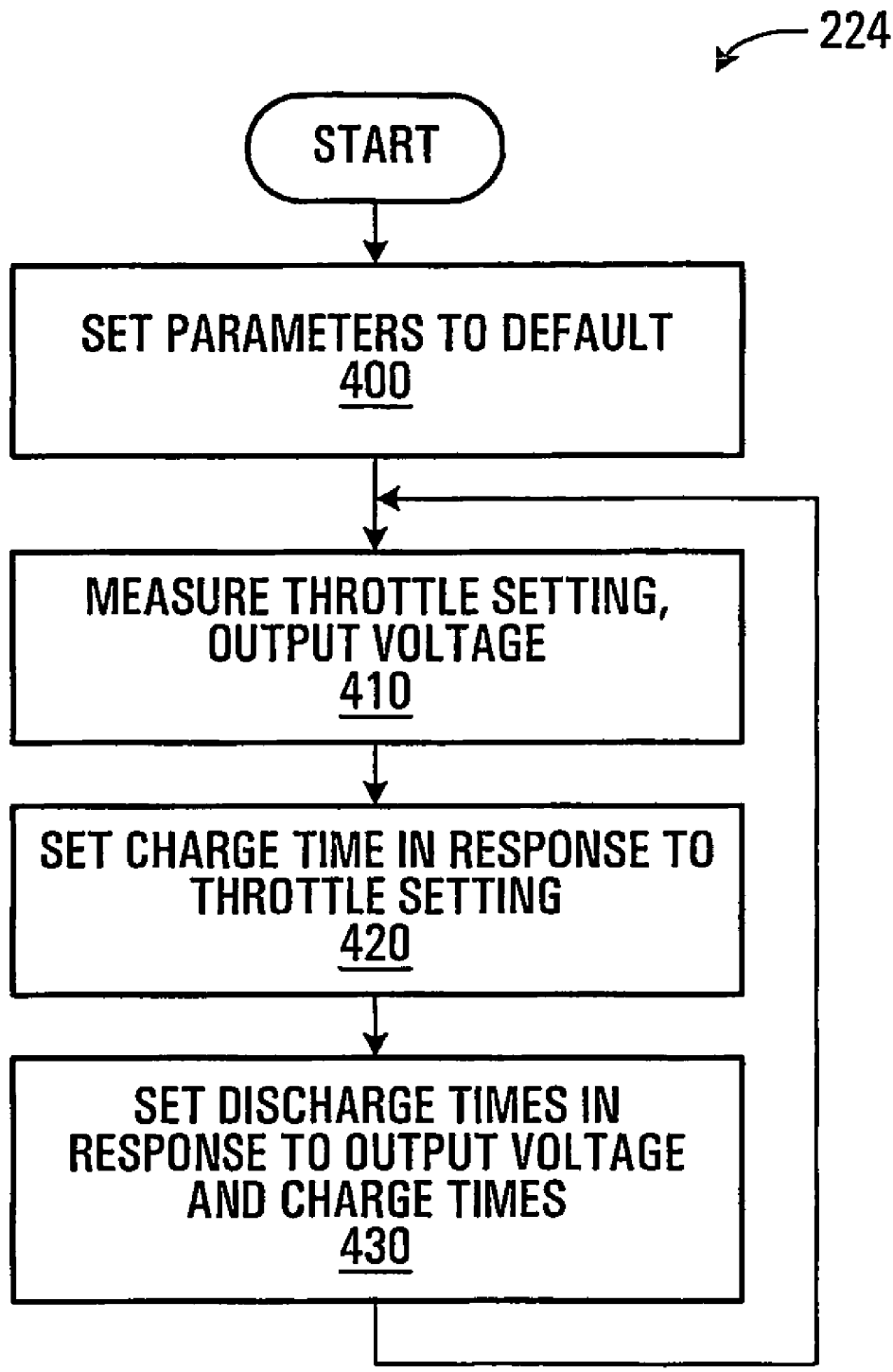
FIG. 7 is a flow chart of a parameters routine executed by the microcontroller of the energy accumulation device shown in FIG. 4.

Referring to FIGS. 2, 3, 4 and 7, the parameters routine executed by the microcontroller 132 of the energy accumulation device 102 is shown generally at 224 in FIG. 7. Generally, in this embodiment, the parameters routine 224 configures the controller 130, or more particularly, programs the microcontroller 132, to define charging and discharging parameters and to store such parameters in the charge parameters store 270 and the discharge parameters store 280, for use by the microcontroller 132 in controlling charging and discharging of the first and second energy accumulators 120 and 122.

The parameters routine 224 begins with a first block 400 of instruction codes, which directs the microcontroller 132 to set the contents of the various fields of the charge parameters store 270 and the discharge parameters store 280 in the RAM 261 equal to the contents of the default parameters store 240 in the FLASH memory 221. In this embodiment, the contents of the charge time fields 274 and discharge time fields 284 for each such record are initially set to zero. The default duty cycle and duty cycle frequency fields may be set to any suitable default values (in this embodiment, the default duty cycle is 50% on, 50% off, and the duty cycle frequency is equal to the clock frequency of the microcontroller 132, which in this embodiment is 4 MHz).

Block 410 then directs the microcontroller 132 to receive a charge time control signal and a discharge time signal. More particularly, to receive the charge time signal, block 410 directs the microcontroller 132 to receive digital signals from the A/D converter 166 of the charge time control signal generator 160, representing the variable resistance of the variable resistor 162, which in turn is determined by a manually adjusted setting by a user of a rotatable switch (not shown). As noted above, the digital signals received from the A/D converter 166 represent a value between 0 and 255, proportional to the measured resistance of the variable resistor 162. Block 410 directs the microcontroller 132 to store this received value in the throttle setting register 262 in the RAM 261.

In this embodiment, to receive the discharge time control signal, block 410 directs the microcontroller 132 to receive digital signals from the A/D converter 182 of the discharge time control signal generator 170, representing a digital value between 0 and 255, which in turn is proportional to the voltage on the output line 156. Block 410 directs the microcontroller to store this received discharge time control value in the output voltage register 264 in the RAM 261. Block 420 then directs the microcontroller 132 to adjust respective durations for which the first switch and the third switch (in this embodiment, the FET 142 and the FET 146 respectively) are maintained closed to charge the first and second capacitors 124 and 126 respectively, in response to the charge time control signal received above at block 410. More particularly, in this embodiment, block 420 directs the microcontroller to copy the contents of the throttle setting register 262 into the charge time field 274 of the record in the charge parameters store 270 for each of the FETs 142 and 144. Thus, as the value stored in the throttle setting register 262 is a value between 0 and 255, the charge time field 274 contents are also values between 0 and 255. As will be evident from the description below of the accumulation and transfer routine 222, the microcontroller 132 interprets the charge time value between 0 and 255 as a ($1/256$) fraction of a pre-defined maximum charge time interval, which in this embodiment is 10 milliseconds.

Thus, in this embodiment, the charge time field 274 contents are the same for both the FET 142 and the FET 146, although alternatively, different charge times may be set if desired. As a further alternative, if desired, rather than setting the charge time values equal to the throttle setting value, different charge time values may be obtained by reference to the charge parameters look-up table 242.

Block 430 then configures the controller 130 to adjust respective durations for which the second switch and the fourth switch (in this embodiment, the FET 144 and the FET 148 respectively) are maintained closed to discharge the first and second capacitors 124 and 126 respectively, in response to the discharge time control signal received above at block 410. To achieve this, in the present embodiment, block 430 directs the processor circuit to set the duration for the second switch (which in this embodiment is the FET 144) as follows:

$$T_{DISCHARGE} = T_{CHARGE} - (V_{DESIRED} - V_{OUTPUT}) = T_{CHARGE} - V_{DESIRED} + V_{OUTPUT}$$

wherein:

$T_{DISCHARGE}$ is a value representing the discharge time for the FET 144, in units of $1/256^{th}$ of a duration of a cycle;

$T_{CHARGE}$ is the charge time value stored in the charge time field 274 of the record in the charge parameters store 270 corresponding to the first switch (which in this embodiment is the FET 142);

$V_{OUTPUT}$ is the output voltage value stored in the output voltage register 264; and $V_{DESIRED}$ is a predetermined value between 0 and 255 representing a desired output voltage level (in this embodiment, $V_{DESIRED} = 130$).

For faster operation, if desired, the above value $T_{DISCHARGE}$ may be obtained by reference to the discharge parameters look-up table 244, rather than by directly calculating the above value.

Block 430 directs the microcontroller 132 to store the above value $T_{DISCHARGE}$ in the discharge time field 284 of the record in the discharge parameters store 280 corresponding to the FET 144. In the present embodiment, the discharge times for the second switch (in this embodiment, the FET 144) and the fourth switch (in this embodiment, the FET 148) are the same, and thus, in the present embodiment, block 430 also directs the microcontroller 132 to store this value in the discharge time field 284 of the discharge parameters store record corresponding to the FET 148. Alternatively, if desired, the discharge time value for the FET 148 may be calculated separately using the above relationship, substituting the value $T_{CHARGE}$ for the FET 146 rather than the value $T_{CHARGE}$ for the FET 142.

Following execution of block 430, the microcontroller 132 is directed back to block 410, to re-measure the throttle setting and output voltage as described above, and to continue adjusting the charge and discharge parameters as described above in connection with blocks 420 and 430.

Alternatively, if desired, the parameters routine 224 may also direct the microcontroller 132 to adjust other charge and discharge parameters, such as the duty cycle and duty cycle frequency for each of the FETs 142, 144, 146 and 148, for example.

Accumulation and Transfer Routine

Figure 8:
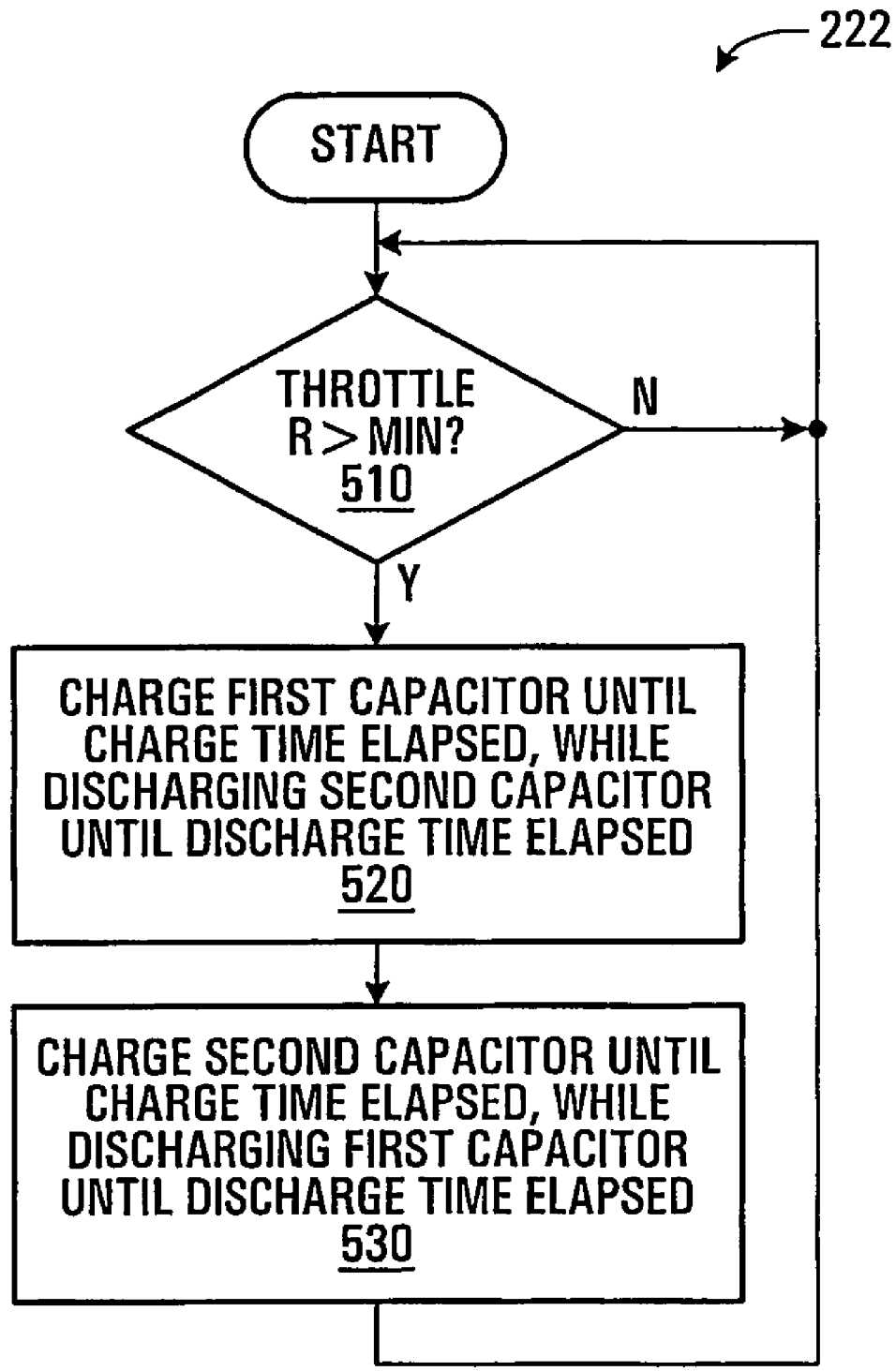
FIG. 8 is a flow chart of an accumulation and transfer routine executed by the microcontroller of the energy accumulation device shown in FIG. 4.

Referring to FIGS. 2, 3, 4, 7 and 8, the accumulation and transfer routine is shown in greater detail at 222 in FIG. 8. In this embodiment, the parameters routine 224 shown in FIG. 7 and the accumulation and transfer routine 222 shown in FIG. 8 are concurrently executed threads. Alternatively, these routines may be executed in alternating fashion or in another suitable temporal relationship, if desired.

Generally, the accumulation and transfer routine 222 configures or programs the controller 130 of the energy accumulation device 102 to repeatedly execute a plurality of cycles in succession, to accumulate energy in the energy accumulators, and to transfer such accumulated energy to the energy transfer device 108. More particularly, the accumulation and transfer routine configures the microcontroller 132 to cooperate with the energy transfer device 108, to transfer accumulated energy from the second energy accumulator 122 into the energy supply 104 during a first cycle, and to transfer accumulated energy from an energy accumulator of the energy accumulation device 102 other than the second energy accumulator 122 into the energy supply during a second cycle. More particularly still, in the present embodiment there are two such cycles which the microcontroller 132 is configured to repeatedly execute in succession, and there are two energy accumulators, namely, the first and second energy accumulators 120 and 122. Thus, in the present embodiment, the energy accumulator other than the second energy accumulator (from which energy is transferred during the second cycle) is the first energy accumulator 120. Alternatively, however, if desired, a different number of cycles and a different (not necessarily the same) number of energy accumulators may be substituted. For example, a set of three cycles may be repeated in succession, and a third energy accumulator may be provided.

In this embodiment, the accumulation and transfer routine 222 begins with a first block 510 of codes, which directs the microcontroller 132 to read the contents of the throttle setting register 262 (discussed above in connection with block 410 of the parameters routine 224), and to determine whether the throttle setting value stored therein is greater than a minimum throttle value (in this embodiment, zero). If it is not, the microcontroller 132 is directed to wait at block 510 until the throttle setting value is greater than the minimum value, indicating user actuation of the throttle.

If at block 510 the throttle setting value is greater than the minimum throttle value, block 520 configures the controller 130 of the energy accumulation device 102 to execute the first cycle, or more particularly, to control the switching system 140 to charge the first capacitor 124 and discharge the second capacitor 126 into the energy supply 104 during the first cycle. (If desired, the discharge of the second capacitor may be omitted for the first execution of the first cycle, as the second capacitor will not have yet acquired a charge; accordingly, the second capacitor may be discharged only during the second and subsequent executions of the first cycle, if desired.)

To achieve this, in this embodiment, block 520 configures the controller 130 to maintain the first switch closed while maintaining the second switch open during the first cycle, to place the first capacitor 124 in series with the energy supply 104 and the load 106 while isolating the first capacitor 124 from the energy transfer device 108. Block 520 also configures the controller 130 to maintain the third switch open while maintaining the fourth switch closed during the first cycle, to isolate the second capacitor 126 from the load 106 while placing the second capacitor 126 in communication with the energy transfer device 108.

More particularly, block 520 first directs the microcontroller to maintain the second switch and the third switch open, by maintaining the FETs 144 and 146 respectively in their "off" (non-conducting) states, to prevent discharge of the first capacitor 124 onto the output line 156 and to prevent charging of the second capacitor 126 from the input line 152, respectively. The FETs 144 and 146 will already be in their "off" states each time block 520 is executed to implement the first cycle, as the microcontroller 132 will have been directed to switch the FETs 144 and 146 off at the end of block 530, discussed below.

Block 520 then directs the microcontroller 132 to close the first and fourth switches, by turning the FETs 142 and 148 on, to allow the first capacitor 124 to accumulate charge from the input line 152 in communication with the load 106, and to allow the second capacitor 126 to discharge onto the output line 156 in communication with the energy transfer device 108, respectively. More particularly, block 520 directs the microcontroller 132 to maintain the FET 142 in its "on" (conducting) state for a time interval specified by the contents of the charge time field 274 of the record in the charge parameters store 270 corresponding to the FET 142. During such "on" time, the FET 142 is operated at a duty cycle and duty cycle frequency specified by the contents of the duty cycle field 276 and duty cycle frequency field 278 of the corresponding charge parameters store record. As soon as the specified charge time has elapsed, block 520 directs the microcontroller to open the first switch, by switching the FET 142 to its "off" (non-conducting) state. Similarly, block 520 directs the microcontroller 132 to maintain the FET 148 in its "on" (conducting) state for a time interval specified by the contents of the discharge time field 284 of the record in the discharge parameters store 280 corresponding to the FET 148, during which time the FET 148 is operated at the duty cycle and frequency specified by the corresponding fields 286 and 288 of the discharge parameters store record. As soon as the specified discharge time has elapsed, block 520 directs the microcontroller to open the fourth switch, by switching the FET 148 to its "off" (non-conducting) state.

Following execution of the first cycle at block 520 above, block 530 configures the controller 130 of the energy accumulation device 102 to execute the second cycle, or more particularly, to control the switching system 140 to charge the second capacitor 126 and discharge the first capacitor 124 into the energy supply 104 during the second cycle.

To achieve this, in this embodiment, block 530 configures the controller 130 to maintain the first switch open while maintaining the second switch closed during the second cycle, to isolate the first capacitor 124 from the load 106 while placing the first capacitor 124 in communication with the energy transfer device 108. Block 530 also configures the controller 130 to maintain the third switch closed while maintaining the fourth switch open during the second cycle, to place the second capacitor 126 in series with the energy supply 104 and the load 106 while isolating the second capacitor 126 from the energy transfer device 108.

More particularly, block 530 first directs the microcontroller to maintain the first switch and the fourth switch open, by maintaining the FETs 142 and 148 respectively in their "off" (non-conducting) states, to prevent charging of the first capacitor 124 from the input line 152, and to prevent discharge of the second capacitor 126 onto the output line 156, respectively. The FETs 142 and 148 will already be in their "off" states each time block 530 is executed to implement the second cycle, as the microcontroller 132 will have been directed to switch the FETs 142 and 148 off at the end of block 520, when the specified charge time and discharge time have elapsed, as discussed above.

Block 530 then directs the microcontroller 132 to close the second and third switches, by turning the FETs 144 and 146 on, to allow the first capacitor 124 to discharge onto the output line 156 in communication with the energy transfer device 108, and to allow the second capacitor 126 to accumulate charge from the input line 152 in communication with the load 106, respectively. More particularly, block 530 directs the microcontroller 132 to maintain the FET 146 in its "on" (conducting) state for a time interval specified by the contents of the charge time field 274 of the record in the charge parameters store 270 corresponding to the FET 146. During such "on" time, the FET 146 is operated at a duty cycle and duty cycle frequency specified by the contents of the duty cycle field 276 and duty cycle frequency field 278 of the corresponding charge parameters store record. As soon as the specified charge time has elapsed, block 530 directs the microcontroller to open the third switch, by switching the FET 146 to its "off" (non-conducting) state. Similarly, block 530 directs the microcontroller 132 to maintain the FET 144 in its "on" (conducting) state for a time interval specified by the contents of the discharge time field 284 of the record in the discharge parameters store 280 corresponding to the FET 144, during which time the FET 144 is operated at the duty cycle and frequency specified by the corresponding fields 286 and 288 of the corresponding discharge parameters store record. As soon as the specified discharge time has elapsed, block 530 directs the microcontroller to open the second switch, by switching the FET 144 to its "off" (non-conducting) state.

Following completion of the second cycle at block 530, the controller 130 is directed back to blocks 510 through 530, to continue repeatedly executing the first and second cycles in succession, as long as the throttle setting detected at block 510 remains above the minimum throttle value.

Transfer Control Routine

Figure 9:
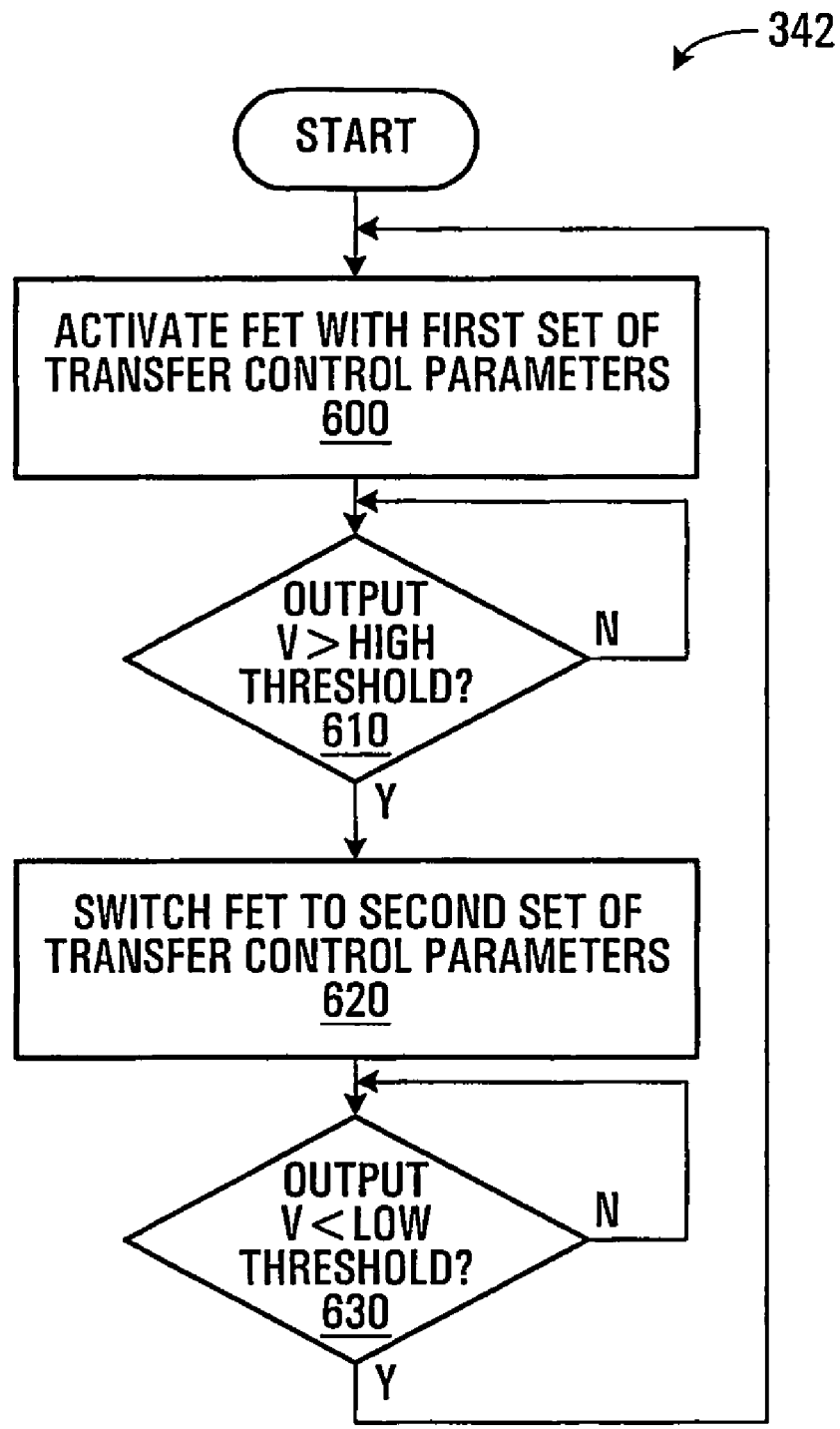
FIG. 9 is a flow chart of a transfer control routine executed by the microcontroller of the energy transfer device shown in FIG. 6.

Referring to FIGS. 2, 5, 6 and 9, the transfer control routine is shown in greater detail at 342 in FIG. 9. Generally, the transfer control routine 342 configures the controller 302 of the energy transfer device 108 to permit discharge of the capacitors 124 and 126 into the energy supply 104.

As discussed above in greater detail in connection with the energy transfer device 108 shown in FIG. 5, the voltage received at the input port 300 of the energy transfer device 108 resulting from the discharge of the capacitors 124 and 126 is typically up to about 10 V in the present embodiment, but is boosted to a desired voltage exceeding the voltage of the energy supply 104 (in this embodiment 24 V), in order to effectively allow the capacitors 124 and 126 to discharge through the energy transfer device 108 into the energy supply 104 via the output port 304. In this regard, it has been found that the apparatus 100 functions more effectively if the voltage at the input port 300 is considerably lower than the desired voltage at the output port 304, and may be even more effective if the input voltage is lower still, on the order of about 1 V, for example. However, desired voltage relationships will vary with the requirements of a particular embodiment. In this embodiment, also as noted above, this voltage boost is achieved by turning the transistor 308 to its "on" (conducting) state, thereby permitting current to flow through the inductor 306 to ground. In the present embodiment, the transfer control routine 342 controls the manner in which the transistor 308 is actuated, to achieve the desired control of the output voltage at the output port 304 of the energy transfer device 108.

In this embodiment, the transfer control routine 342 begins with a first block 600 of codes, which directs the microcontroller 303 to operate the transistor 308 to its "on" (conducting) state, with a first set of transfer control parameters. More particularly, in this embodiment the first set of transfer control parameters includes a first duty cycle, and a first duty cycle frequency at which the FET cycles on/off while nominally in the "on" conducting state. More particularly still, in this embodiment the first duty cycle is 50% on/50% off, and the first duty cycle frequency is 70 Hz.

Block 610 then directs the microcontroller 303 to receive an output voltage value from the output voltage monitor 310, representing the output voltage at the output port 304 of the energy transfer device 108, and to compare the detected output voltage value to a pre-determined high threshold value, which in this embodiment is 30V. If the output voltage does not exceed the high threshold value, the microcontroller 303 is directed to continue operating the transistor 308 with the first set of transfer control parameters and to continue monitoring the output voltage at block 610, until the output voltage does exceed the high threshold value.

If at block 610 the output voltage exceeds the high threshold value, block 620 directs the microcontroller to switch the transistor 308 to a second set of transfer control parameters. In this embodiment the second set of transfer control parameters includes a second duty cycle and a second duty cycle frequency. More particularly, in this embodiment the second duty cycle is 50% on/50% off (the same as the first duty cycle value), but the second duty cycle frequency is 60 Hz, slightly less than the first duty cycle frequency. When the transistor 308 is operated at this lower frequency, the current through the inductor 306, and hence the voltage boost that it produces, tends to drop.

Block 630 then directs the microcontroller 303 to receive an output voltage value from the output voltage monitor 310, representing the output voltage at the output port 304 of the energy transfer device 108, and to compare the detected output voltage value to a pre-determined low threshold value, which in this embodiment is 28V. If the output voltage is greater than or equal to the low threshold value, the microcontroller 303 is directed to continue operating the transistor 308 with the second set of transfer control parameters and to continue monitoring the output voltage at block 630, until the output voltage is less than the low threshold value.

If at block 630 the output voltage is less than the low threshold value, the microcontroller is directed back to block 600, to switch the transistor 308 to the first set of transfer control parameters, thereby causing the output voltage to tend to increase.

In practice, in the present embodiment, the presence of the energy supply 104 and the load 106 tend to oppose the increase in voltage produced by the inductor 306, and tend to reduce the output voltage toward the voltage of the energy supply 104. Thus, in this embodiment the transistor 308 is typically operated with the first set of transfer control parameters most of the time.

Alternatives

Figure 10:
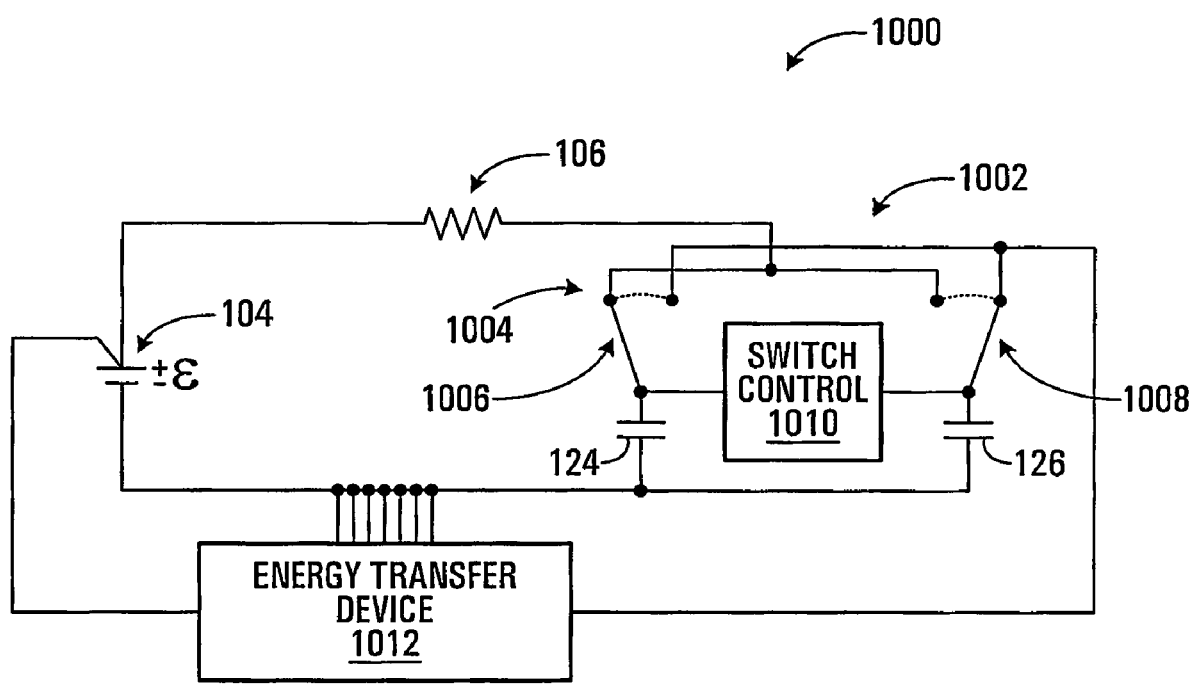
FIG. 10 is a circuit diagram of an apparatus for managing energy supplied by an energy supply, according to a second embodiment of the invention.

Referring to FIG. 10, an apparatus according to a second embodiment of the invention is shown generally at 1000 in FIG. 10. In this embodiment, the apparatus 1000 includes a mechanical energy accumulation device 1002, including a mechanical switching system shown generally at 1004. First and second mechanical switches 1006 and 1008 are controlled by a switch control 1010, to alternate between a first cycle in which energy is accumulated in the first capacitor 124 while accumulated energy in the second capacitor 126 is transferred to an energy transfer device 1012 and subsequently into the energy supply 104, and a second cycle in which energy is accumulated in the second capacitor 126 while accumulated energy in the first capacitor 124 is transferred to the energy transfer device 1012 and subsequently into the energy supply 104. If desired, the energy transfer device 1012 may also be modified, to include mechanically-switched control of the output voltage boost, rather than transistor-controlled voltage boost as described earlier herein.

Although such mechanical embodiments of the invention may be advantageous in some senses, such as simplicity of design, they also tend to suffer from disadvantages, such as greater energy loss and cumbersome size, as compared to embodiments employing transistor-controlled or other solid state switching systems.

Figure 11:
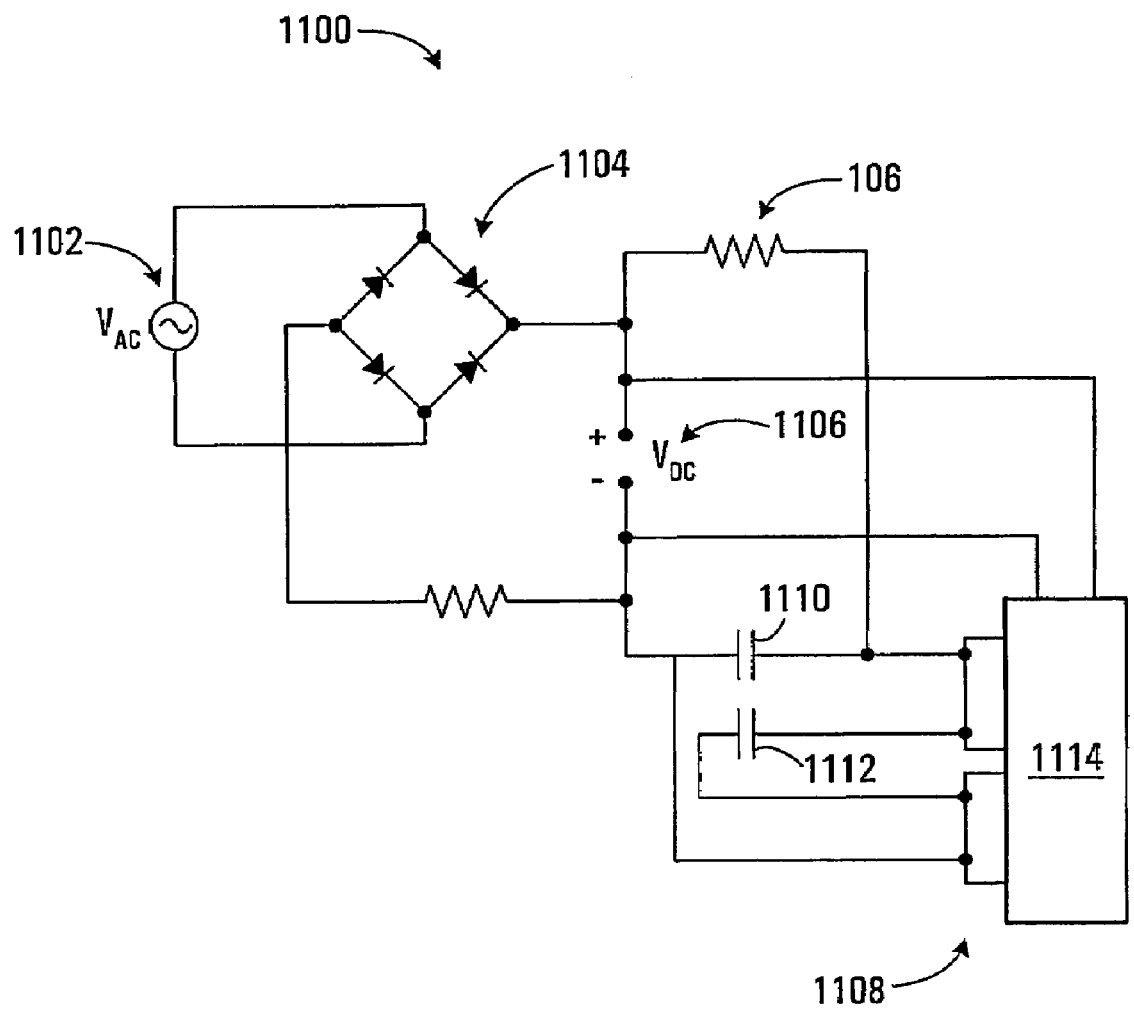
FIG. 11 is a circuit diagram of an apparatus for managing energy supplied by an energy supply, according to a third embodiment of the invention.

Although the exemplary embodiments described above involve an energy supply operable to supply direct current (DC) power, alternatively, embodiments of the invention may be applied in alternating current (AC) system. For example, referring to FIG. 11, an apparatus according to a third embodiment of the invention is shown generally at 1100. In this embodiment, an energy supply 1102 includes an alternating current (AC) energy supply. A bridge rectifier shown generally at 1104 serves to convert AC power from the energy supply 1102 into direct current (DC) power, which is applied to the load 106 as described above. If desired, the bridge rectifier 1104 may also include a transformer (not shown) and an RC or LC filter (not shown), as is known in the art, to smooth out the voltage produced by the bridge rectifier. Effectively, therefore, the AC energy supply is converted to a DC energy supply 1106. If desired, the effective DC energy supply 1106 may include a capacitor or capacitor bank (not shown). A control system 1108, which in this embodiment effectively includes both an energy accumulation device and an energy transfer device, includes first and second energy accumulators 1110 and 1112, which in this embodiment include respective capacitors. A controller 1114 controls the energy accumulators in a manner similar to that described above in connection with the previous embodiments, to accumulate energy, and to transfer the accumulated energy to the AC/DC energy supply in a manner similar to that described above.

More generally, while specific embodiments of the invention have been described and illustrated, such embodiments should be considered illustrative of the invention only and not as limiting the invention as construed in accordance with the accompanying claims.

What is claimed is:

1. An apparatus for managing energy supplied by an energy supply, the apparatus comprising:
   a) an energy accumulation device comprising:
      i) an energy accumulator, comprising a first energy accumulator for accumulating energy during a first cycle, and a second energy accumulator for accumulating energy during a second cycle; and
      ii) a controller configured to place the energy accumulator in electrical communication with the energy supply and with a load; and
   b) an energy transfer device in communication with the energy accumulation device and with the energy supply and configured to transfer accumulated energy from the energy accumulator to the energy supply.

2. The apparatus of claim 1 wherein the controller is configured to temporarily place the energy accumulator in electrical communication with the load and the energy supply.

3. The apparatus of claim 2 wherein the controller is configured to temporarily interpose the energy accumulator in series with the load and the energy supply.

4. The apparatus of claim 2 wherein the energy accumulator comprises a capacitor.

5. The apparatus of claim 4 wherein the energy transfer device is configured to permit discharge of the capacitor into the energy supply.

6. The apparatus of claim 1 wherein the energy accumulation device and the energy transfer device are configured to cooperate to transfer accumulated energy from the second energy accumulator into the energy supply during the first cycle, and to transfer accumulated energy from an energy accumulator of the energy accumulation device other than the second energy accumulator into the energy supply during the second cycle.

7. The apparatus of claim 6 wherein the energy accumulator other than the second energy accumulator comprises the first energy accumulator.

8. The apparatus of claim 7 wherein the energy accumulation device is configured to cooperate to repeatedly execute the first and second cycles in succession.

9. The apparatus of claim 8 wherein the first and second energy accumulators comprise first and second capacitors respectively.

10. The apparatus of claim 9 wherein the controller of the energy accumulation device is configured to control a switching system to charge the first capacitor and discharge the second capacitor into the energy supply during the first cycle, and to charge the second capacitor and discharge the first capacitor into the energy supply during the second cycle.

11. The apparatus of claim 10 wherein the controller is configured to maintain a first switch closed while maintaining a second switch open during the first cycle, to place the first capacitor in series with the energy supply and the load while isolating the first capacitor from the energy transfer device.

12. The apparatus of claim 11 wherein the controller is configured to maintain a third switch open while maintaining a fourth switch closed during the first cycle, to isolate the second capacitor from the load while placing the second capacitor in communication with the energy transfer device.

13. The apparatus of claim 12 wherein the controller is configured to maintain the first switch open while maintaining the second switch closed during the second cycle, to isolate the first capacitor from the load while placing the first capacitor in communication with the energy transfer device.

14. The apparatus of claim 13 wherein the controller is configured to maintain the third switch closed while maintaining the fourth switch open during the second cycle, to place the second capacitor in series with the energy supply and the load while isolating the second capacitor from the energy transfer device.

15. The apparatus of claim 14 wherein the controller is configured to adjust respective durations for which the first switch and the third switch are maintained closed to charge the first and second capacitors respectively, in response to a charge time control signal.

16. The apparatus of claim 15 further comprising a charge time control signal generator configured to generate the charge time control signal.

17. The apparatus of claim 16 wherein the charge time control signal generator is configured to generate the charge time control signal in response to an adjustable setting of a throttle control.

18. The apparatus of claim 17 further comprising the throttle control, the throttle control comprising a variable resistor, and wherein the charge time control signal generator comprises an analog-to-digital converter configured to generate the charge time control signal in response to a resistance of the variable resistor.

19. The apparatus of claim 14 wherein the controller is configured to adjust respective durations for which the second switch and the fourth switch are maintained closed to discharge the first and second capacitors respectively, in response to a discharge time control signal.

20. The apparatus of claim 19 further comprising a discharge time control signal generator configured to generate the discharge time control signal.

21. The apparatus of claim 20 wherein the discharge time control signal generator is configured to generate the discharge time control signal in response to a voltage of the discharge of the first and second capacitors.

22. The apparatus of claim 20 wherein the discharge time control signal generator comprises an analog-to-digital converter.

23. The apparatus of claim 10 further comprising the switching system, wherein the switching system comprises a transistor switching system.

24. The apparatus of claim 14 further comprising the first, second, third and fourth switches, each of which comprises a respective transistor.

25. The apparatus of claim 24 wherein each of the first, second, third and fourth switches further comprises a driver for operating each of the transistors in response to control signals from the controller.

26. The apparatus of claim 10 further comprising the switching system, wherein the switching system comprises a mechanical switching system.

27. The apparatus of claim 1 wherein the controller comprises a microcontroller.

28. The apparatus of claim 1 wherein the energy transfer device comprises an input port for receiving the accumulated energy from the energy accumulation device in the form of an electrical discharge.

29. The apparatus of claim 28 wherein the energy transfer device comprises a second controller configured to increase an output voltage at an output port of the energy transfer device in communication with the energy supply, to cause the output voltage to tend to a desired voltage exceeding a voltage of the energy supply.

30. The apparatus of claim 29 wherein the energy transfer device comprises an inductor, and wherein the second controller is configured to increase the output voltage by allowing current to flow from the input port through the inductor until the output voltage is at least the desired voltage.

31. The apparatus of claim 30 wherein the energy transfer device further comprises a transistor in communication with the inductor, and wherein the second controller is configured to control the transistor to control the current through the inductor.

32. The apparatus of claim 30 wherein the energy transfer device further comprises an output voltage monitor configured to monitor the output voltage, and wherein the second controller is configured to control the current through the inductor in response to the output voltage.

33. The apparatus of claim 29 wherein the energy transfer device comprises an isolator configured to prevent current from flowing from the energy supply into the output port of the energy transfer device.

34. The apparatus of claim 33 wherein the isolator comprises a diode.

35. An apparatus for managing energy supplied by an energy supply, the apparatus comprising:
a) means for accumulating energy, in electrical communication with the energy supply and with a load, wherein the means for accumulating comprises a first means for accumulating energy during a first cycle and a second means for accumulating energy during a second cycle; and
b) means for transferring accumulated energy from the means for accumulating energy to the energy supply.

36. The apparatus of claim 35 further comprising means for temporarily placing the means for accumulating energy in electrical communication with the load and the energy supply.

37. The apparatus of claim 36 wherein the means for temporarily placing comprises means for temporarily interposing the means for accumulating energy in series with the load and the energy supply.

38. The apparatus of claim 36 wherein the means for accumulating comprises a capacitor.

39. The apparatus of claim 38 wherein the means for transferring comprises means for permitting discharge of the capacitor into the energy supply.

40. The apparatus of claim 35 wherein the means for transferring comprises:
means for transferring energy from the second means for accumulating into the energy supply during the first cycle; and
means for transferring energy from a means for accumulating other than the second means for accumulating into the energy supply during the second cycle.

41. The apparatus of claim 40 wherein the means for accumulating other than the second means for accumulating comprises the first means for accumulating.

42. The apparatus of claim 41 further comprising means for repeatedly executing the first and second cycles in succession.

43. The apparatus of claim 42 wherein the first and second means for accumulating comprise first and second capacitors respectively.

44. The apparatus of claim 43 wherein the means for repeatedly executing comprises means for controlling a switching system to charge the first capacitor and discharge the second capacitor into the energy supply during the first cycle, and to charge the second capacitor and discharge the first capacitor into the energy supply during the second cycle.

45. The apparatus of claim 44 wherein the means for controlling comprises means for maintaining a first switch closed while maintaining a second switch open during the first cycle, to place the first capacitor in series with the energy supply and the load while isolating the first capacitor from an energy transfer device.

46. The apparatus of claim 45 wherein the means for controlling further comprises means for maintaining a third switch open while maintaining a fourth switch closed during the first cycle, to isolate the second capacitor from the load while placing the second capacitor in communication with the energy transfer device.

47. The apparatus of claim 46 wherein the means for controlling comprises means for maintaining the first switch open while maintaining the second switch closed during the second cycle, to isolate the first capacitor from the load while placing the first capacitor in communication with the energy transfer device.

48. The apparatus of claim 47 wherein the means for controlling further comprises means for maintaining the third switch closed while maintaining the fourth switch open during the second cycle, to place the second capacitor in series with the energy supply and the load while isolating the second capacitor from the energy transfer device.

49. The apparatus of claim 48 further comprising means for adjusting respective durations for which the first switch and the third switch are maintained closed to charge the first and second capacitors respectively, in response to a charge time control signal.

50. The apparatus of claim 49 further comprising means for generating the charge time control signal.

51. The apparatus of claim 50 wherein the means for generating the charge time control signal comprises means for generating the charge time control signal in response to an adjustable throttle setting.

52. The apparatus of claim 48 further comprising means for adjusting respective durations for which the second switch and the fourth switch are maintained closed to discharge the first and second capacitors respectively, in response to a discharge time control signal.

53. The apparatus of claim 52 further comprising means for generating the discharge time control signal.

54. The apparatus of claim 53 wherein the means for generating the discharge time control signal comprises means for generating the discharge time control signal in response to a voltage of the discharge of the first and second capacitors.

55. The apparatus of claim 44 wherein the means for controlling a switching system comprises means for controlling a transistor switching system.

56. The apparatus of claim 48 further comprising the first, second, third and fourth switches, and wherein each of the switches comprises a respective transistor.

57. The apparatus of claim 44 wherein the means for controlling a switching system comprises means for controlling a mechanical switching system.

58. The apparatus of claim 35 wherein the means for transferring comprises means for receiving the accumulated energy from the means for accumulating in the form of an electrical discharge.

59. The apparatus of claim 58 further comprising means for increasing an output voltage of the means for transferring, to cause the output voltage to tend to a desired voltage exceeding a voltage of the energy supply.

60. The apparatus of claim 59 wherein the means for increasing the output voltage comprises means for allowing current to flow from the means for receiving through a means for inducting until the output voltage is at least the desired voltage.

61. The apparatus of claim 60 further comprising means for monitoring the output voltage and means for controlling the current through the inductor in response to the output voltage.

62. The apparatus of claim 59 further comprising means for preventing current from flowing from the energy supply into means for transferring.

63. A method of managing energy supplied by an energy supply, the method comprising:
a) accumulating energy in an energy accumulator in electrical communication with the energy supply and with a load, wherein accumulating comprises accumulating energy in a first energy accumulator during a first cycle, and accumulating energy in a second energy accumulator during a second cycle; and
b) transferring accumulated energy from the energy accumulator to the energy supply.

64. The method of claim 63 wherein accumulating comprises temporarily placing the energy accumulator in electrical communication with the load and the energy supply.

65. The method of claim 64 wherein temporarily placing comprises temporarily interposing the energy accumulator in series with the load and the energy supply.

66. The method of claim 64 wherein temporarily placing the energy accumulator comprises temporarily placing a capacitor in electrical communication with the load and the energy supply to charge the capacitor.

67. The method of claim 66 wherein transferring comprises discharging the capacitor into the energy supply.

68. The method of claim 63 wherein transferring comprises transferring accumulated energy from the second energy accumulator into the energy supply during the first cycle, and transferring accumulated energy from an energy accumulator other than the second energy accumulator into the energy supply during the second cycle.

69. The method of claim 68 wherein the energy accumulator other than the second energy accumulator comprises the first energy accumulator.

70. The method of claim 69 wherein accumulating and transferring comprise repeatedly executing the first and second cycles in succession.

71. The method of claim 70 wherein the first and second energy accumulators comprise first and second capacitors respectively.

72. The method of claim 71 wherein executing comprises controlling a switching system to charge the first capacitor and discharge the second capacitor into the energy supply during the first cycle, and to charge the second capacitor and discharge the first capacitor into the energy supply during the second cycle.

73. The method of claim 72 wherein controlling comprises, during the first cycle, maintaining a first switch closed while maintaining a second switch open, to place the first capacitor in series with the energy supply and the load while isolating the first capacitor from an energy transfer device.

74. The method of claim 73 wherein controlling further comprises, during the first cycle, maintaining a third switch open while maintaining a fourth switch closed, to isolate the second capacitor from the load while placing the second capacitor in communication with the energy transfer device.

75. The method of claim 74 wherein controlling comprises, during the second cycle, maintaining the first switch open while maintaining the second switch closed, to isolate the first capacitor from the load while placing the first capacitor in communication with the energy transfer device.

76. The method of claim 75 wherein controlling further comprises, during the second cycle, maintaining the third switch closed while maintaining the fourth switch open, to place the second capacitor in series with the energy supply and the load while isolating the second capacitor from the energy transfer device.

77. The method of claim 76 further comprising adjusting respective durations for which the first switch and the third switch are maintained closed to charge the first and second capacitors respectively, in response to a charge time control signal.

78. The method of claim 77 further comprising generating the charge time control signal.

79. The method of claim 78 wherein generating the charge time control signal comprises generating the charge time control signal in response to an adjustable throttle setting.

80. The method of claim 76 further comprising adjusting respective durations for which the second switch and the fourth switch are maintained closed to discharge the first and second capacitors respectively, in response to a discharge time control signal.

81. The method of claim 80 further comprising generating the discharge time control signal.

82. The method of claim 80 wherein generating the discharge time control signal comprises generating the discharge time control signal in response to a voltage of the discharge of the first and second capacitors.

83. The method of claim 72 wherein controlling a switching system comprises controlling a transistor switching system.

84. The method of claim 76 wherein each of the first, second, third and fourth switches comprises a respective transistor.

85. The method of claim 72 wherein controlling a switching system comprises controlling a mechanical switching system.

86. The method of claim 63 wherein transferring comprises receiving the accumulated energy from the energy accumulation device at an input port of an energy transfer device in the form of an electrical discharge.

87. The method of claim 86 further comprising increasing an output voltage at an output port of the energy transfer device in communication with the energy supply, to cause the output voltage to tend to a desired voltage exceeding a voltage of the energy supply.

88. The method of claim 87 wherein increasing the output voltage comprises allowing current to flow from the input port through an inductor until the output voltage is at least the desired voltage.

89. The method of claim 88 further comprising monitoring the output voltage and controlling the current through the inductor in response to the output voltage.

90. The method of claim 87 further comprising preventing current from flowing from the energy supply into the output port of the energy transfer device.

91. A computer-readable medium storing codes for directing a processor circuit to cause the method of claim 63 to be carried out.

92. A signal embodied in a communications medium, the signal comprising code segments for directing a processor circuit to cause the method of claim 63 to be carried out.

* * * * *